United States Patent
Jons et al.

(10) Patent No.: US 9,725,344 B1
(45) Date of Patent: Aug. 8, 2017

(54) SPIRAL WOUND FILTRATION ASSEMBLY INCLUDING INTEGRAL BIOREACTOR

(71) Applicant: Dow Global Technologies LLC, Midland, MI (US)

(72) Inventors: Steven D. Jons, Eden Prairie, MN (US); Jon E. Johnson, Plymouth, MN (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/501,478

(22) PCT Filed: Sep. 22, 2015

(86) PCT No.: PCT/US2015/051295
§ 371 (c)(1),
(2) Date: Feb. 3, 2017

(87) PCT Pub. No.: WO2016/048923
PCT Pub. Date: Mar. 31, 2016

Related U.S. Application Data

(60) Provisional application No. 62/054,408, filed on Sep. 24, 2014.

(51) Int. Cl.
*C02F 1/44* (2006.01)
*C02F 3/10* (2006.01)
(Continued)

(52) U.S. Cl.
CPC .............. *C02F 3/109* (2013.01); *B01D 63/12* (2013.01); *C02F 3/1268* (2013.01);
(Continued)

(58) Field of Classification Search
None
See application file for complete search history.

(56) References Cited

U.S. PATENT DOCUMENTS 3,720,322 A    3/1973  Harms
4,046,685 A    9/1977  Bray
(Continued)

FOREIGN PATENT DOCUMENTS

DE    3413551    10/1984
DE    4037765    4/1991
(Continued)

OTHER PUBLICATIONS

H.C. Flemming et al., Biofouling-the Achilles heel of membrane pricesses, Desalination, 113 (1997) 215-225.
(Continued)

*Primary Examiner* — Krishnan S Menon
(74) *Attorney, Agent, or Firm* — Edward W. Black

(57) ABSTRACT

A spiral wound filtration assembly including:
i) a pressure vessel comprising a feed port, concentrate port and permeate port;
ii) at least one spiral wound membrane module comprising at least one membrane envelop wound around a permeate tube which forms a permeate pathway to the permeate port; and
iii) a bioreactor having a cylindrical outer periphery extending along an axis (Y) from a first end to a second end, an inlet located near the first end, and an outlet located near the second end; wherein the spiral wound membrane module and bioreactor are serially arranged within the pressure vessel.

6 Claims, 4 Drawing Sheets

US 9,725,344 B1
Page 2

(51) Int. Cl.
*C02F 3/12* (2006.01)
*B01D 63/12* (2006.01)

(52) U.S. Cl.
CPC .. *B01D 2311/04* (2013.01); *B01D 2311/2688* (2013.01); *B01D 2313/143* (2013.01); *B01D 2317/02* (2013.01)

(56) References Cited

U.S. PATENT DOCUMENTS

| | | | |
|---|---|---|---|
| 4,083,780 A | 4/1978 | Call | |
| 4,156,645 A | 5/1979 | Bray | |
| 4,214,994 A | 7/1980 | Kitano et al. | |
| 4,277,344 A | 7/1981 | Cadotte | |
| 4,476,015 A | 10/1984 | Schmitt et al. | |
| 4,511,471 A | 4/1985 | Muller | |
| 4,795,559 A | 1/1989 | Shinjou et al. | |
| 4,937,196 A | 6/1990 | Wrasidlo et al. | |
| 5,128,037 A | 7/1992 | Pearl et al. | |
| 5,238,563 A | 8/1993 | Smith, Jr. et al. | |
| 5,362,393 A | 11/1994 | Kuhme | |
| 5,435,957 A | 7/1995 | Degen et al. | |
| 5,538,642 A | 7/1996 | Solie | |
| 5,563,069 A | 10/1996 | Yang | |
| 5,851,267 A | 12/1998 | Schwartz | |
| 5,851,356 A | 12/1998 | Banning et al. | |
| 5,919,026 A | 7/1999 | Appleton | |
| 6,066,254 A | 5/2000 | Huschke et al. | |
| 6,074,595 A | 6/2000 | Eisberg et al. | |
| 6,156,680 A | 12/2000 | Goettmann | |
| 6,165,303 A | 12/2000 | Darby et al. | |
| 6,187,200 B1 | 2/2001 | Yamamura et al. | |
| 6,224,767 B1 | 5/2001 | Fujiwara et al. | |
| 6,299,772 B1 | 10/2001 | Huschke et al. | |
| 6,632,356 B2 | 10/2003 | Hallan et al. | |
| 6,632,357 B1 | 10/2003 | Barger et al. | |
| 6,878,278 B2 | 4/2005 | Mickols | |
| 6,881,336 B2 | 4/2005 | Johnson | |
| 6,942,797 B1 | 9/2005 | Chancellor et al. | |
| 7,045,063 B2 | 5/2006 | Zhang et al. | |
| 7,048,855 B2 | 5/2006 | de la Cruz | |
| 7,063,789 B2 | 6/2006 | Colby et al. | |
| 7,144,511 B2 | 12/2006 | Vuong | |
| 7,198,719 B2 | 4/2007 | Chikura et al. | |
| 7,208,088 B2 | 4/2007 | Almasian et al. | |
| 7,311,831 B2 | 12/2007 | Bradford et al. | |
| 7,875,177 B2 | 1/2011 | Haynes et al. | |
| 7,951,295 B2 | 5/2011 | Larson et al. | |
| 8,110,016 B2 | 2/2012 | McCollam | |
| 8,142,588 B2 | 3/2012 | McCollam | |
| 8,173,003 B2 | 5/2012 | Li et al. | |
| 8,377,300 B2 | 2/2013 | Katayama et al. | |
| 8,388,842 B2 | 3/2013 | Shelby et al. | |
| 8,388,848 B2 | 3/2013 | Odaka et al. | |
| 8,425,773 B2 | 4/2013 | Bonta et al. | |
| 8,496,825 B1 | 7/2013 | Jons et al. | |
| 8,608,964 B2 | 12/2013 | Hiro et al. | |
| 8,758,489 B2 | 6/2014 | Elwell et al. | |
| 8,778,182 B2 | 7/2014 | Johnson et al. | |
| 2002/0074277 A1 | 6/2002 | Thomassen | |
| 2007/0272628 A1 | 11/2007 | Mickols et al. | |
| 2008/0308504 A1 | 12/2008 | Hallan et al. | |
| 2012/0132575 A1 | 5/2012 | Kuennen et al. | |
| 2012/0193287 A1 | 8/2012 | Brouwer et al. | |
| 2012/0261333 A1* | 10/2012 | Moran | B01D 63/10 210/500.23 |
| 2012/0298578 A1 | 11/2012 | Herrington et al. | |
| 2014/0076794 A1 | 3/2014 | Sakraschinsky | |
| 2014/0166564 A1 | 6/2014 | Quintel | |
| 2016/0122219 A1 | 5/2016 | Tabata et al. | |
| 2016/0122705 A1* | 5/2016 | Lancaster | C02F 3/301 435/29 |
| 2016/0326022 A1* | 11/2016 | Dosoretz | C02F 1/44 |

FOREIGN PATENT DOCUMENTS

| | | |
|---|---|---|
| DE | 102012011816 | 1/2013 |
| EP | 127243 | 12/1984 |
| EP | 1034829 | 9/2000 |
| FR | 2544995 | 11/1984 |
| GB | 1509712 | 5/1978 |
| JP | 58163404 | 9/1983 |
| JP | 2001239136 | 9/2001 |
| JP | 2013202548 | 10/2013 |
| WO | 9638387 | 12/1996 |
| WO | 9823361 | 6/1998 |
| WO | 2007043879 | 4/2007 |
| WO | 2013048801 | 4/2013 |
| WO | 2013130312 | 9/2013 |
| WO | 2013154777 | 10/2013 |
| WO | 2014066035 | 5/2014 |
| WO | 2014120589 | 8/2014 |

OTHER PUBLICATIONS

H. Brouwer et al., Biofouling control in reverse osmosis membranes using rapid biofiltration technology, Desalination 199, vol. 11, issues 1-3 (2006) 15-17.

Vrouwenvelder et al., A novel scenario for biofouling control of spiral wound membrane systems, Water Research 45 (2011) 3890-3898.

* cited by examiner

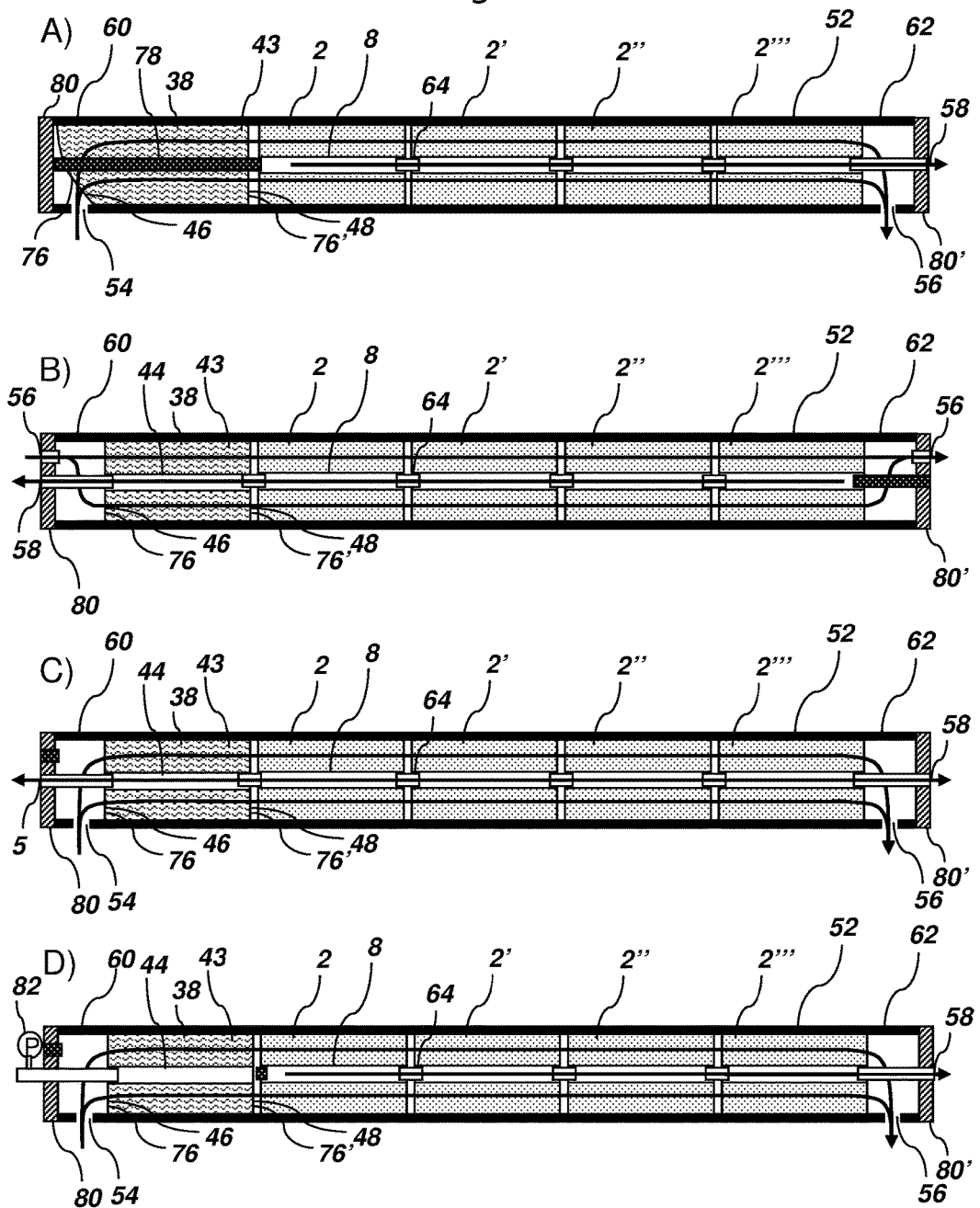

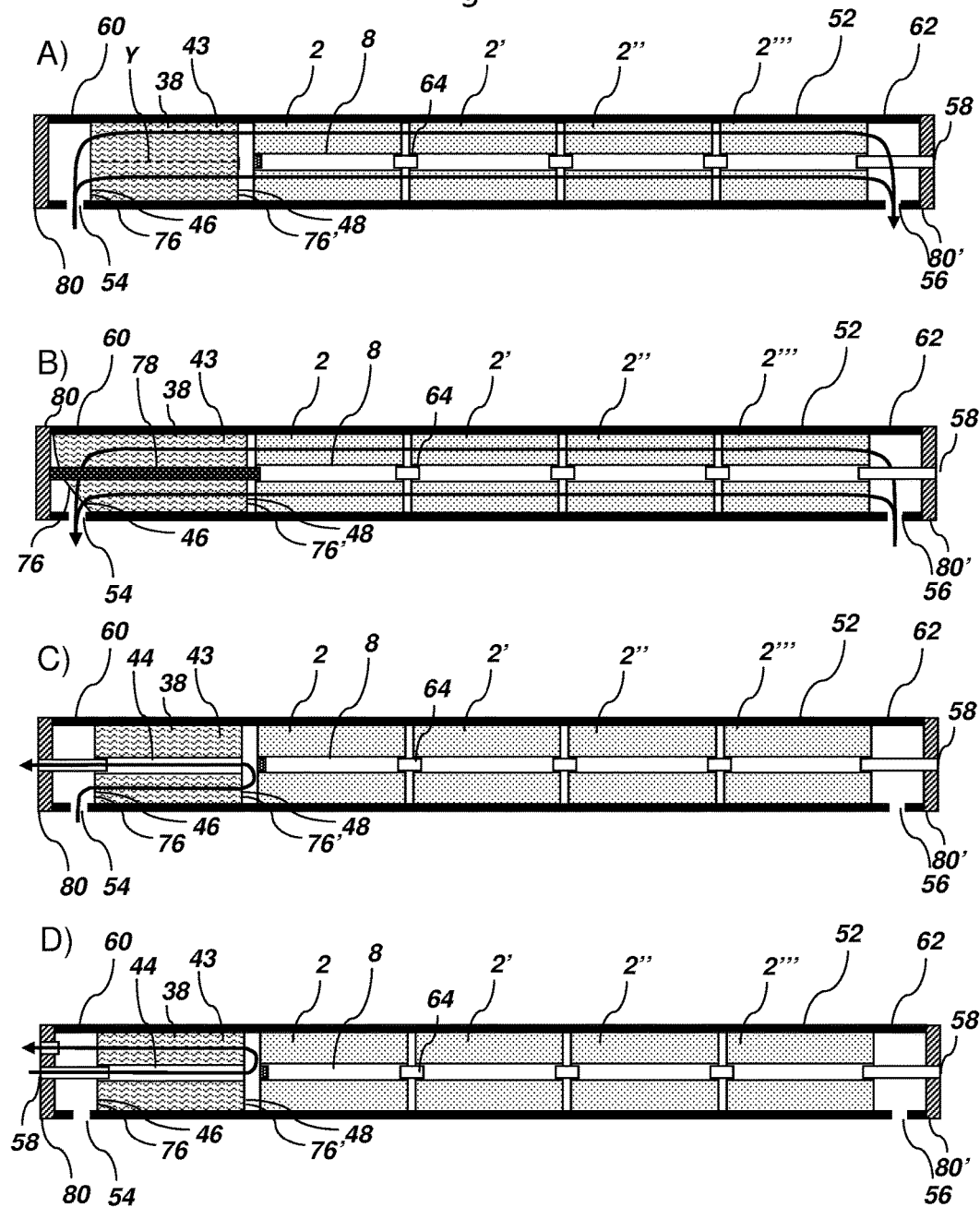

SPIRAL WOUND FILTRATION ASSEMBLY INCLUDING INTEGRAL BIOREACTOR

FIELD

The invention is directed toward spiral wound assemblies including one or more spiral wound membrane modules connected serially with an integral bioreactor within a common vessel.

INTRODUCTION

Spiral wound filtration assemblies are used in a wide variety of fluid separations. In a conventional embodiment, one or more spiral wound membrane modules ("elements") are serially arranged and interconnected within a pressure vessel. During operation pressurized feed fluid is introduced into the vessel, successively passes through the individual modules, and exits the vessel in at least two streams: concentrate and permeate. The performance of spiral wound membrane assemblies often deteriorate over time due to fouling. Fouling involves the formation of debris on various surfaces within the module. More common types of fouling include: scaling, colloidal or particle deposition, organic fouling (adsorption of organic compounds) and biofouling (growth of a biofilm on various surfaces within the module). Biofouling is typically managed by introducing oxidants (e.g. bleach), biocides or biostatic agents in the feed water upstream from spiral wound assembly. Feed water may also be pre-treated with a bioreactor to reduce nutrients that would otherwise contribute to biofouling within the spiral wound assembly. Examples are described in US2012/0193287; U.S. Pat. No. 7,045,063, EP127243; and H. C. Flemming et al., Desalination, 113 (1997) 215-225; H. Brouwer et al., Desalination, vol. 11, issues 1-3 (2006) 15-17. In each of these examples, feed water is pre-treated with a bioreactor at a location upstream from the spiral wound assembly.

SUMMARY

The present invention is directed toward a spiral wound filtration assembly including:
i) a pressure vessel comprising a feed port, concentrate port and permeate port;
ii) at least one spiral wound membrane module comprising at least one membrane envelop wound around a permeate tube which forms a permeate pathway to the permeate port; and
iii) a bioreactor having a cylindrical outer periphery extending along an axis (Y) from a first end to a second end, an inlet located near the first end, and an outlet located near the second end. The spiral wound membrane module and bioreactor are serially arranged within the pressure vessel such that feed liquid from the vessel's feed port flows from the bioreactor's inlet to its outlet. A portion of the liquid then flows across the spiral wound membranes module(s) to exit the vessel at its concentrate port with the remainder of liquid passing through the membranes to exit the vessel at a permeate port.

BRIEF DESCRIPTION OF THE DRAWINGS

The figures are not to scale and include idealized views to facilitate description. Where possible, like numerals have been used throughout the figures and written description to designate the same or similar features.

FIGS. 3A-D are cross-sectional views of various embodiments of the subject invention.

FIGS. 4A-D are cross-sectional views of various embodiments during a cleaning operation.

DETAILED DESCRIPTION

Figure 1:
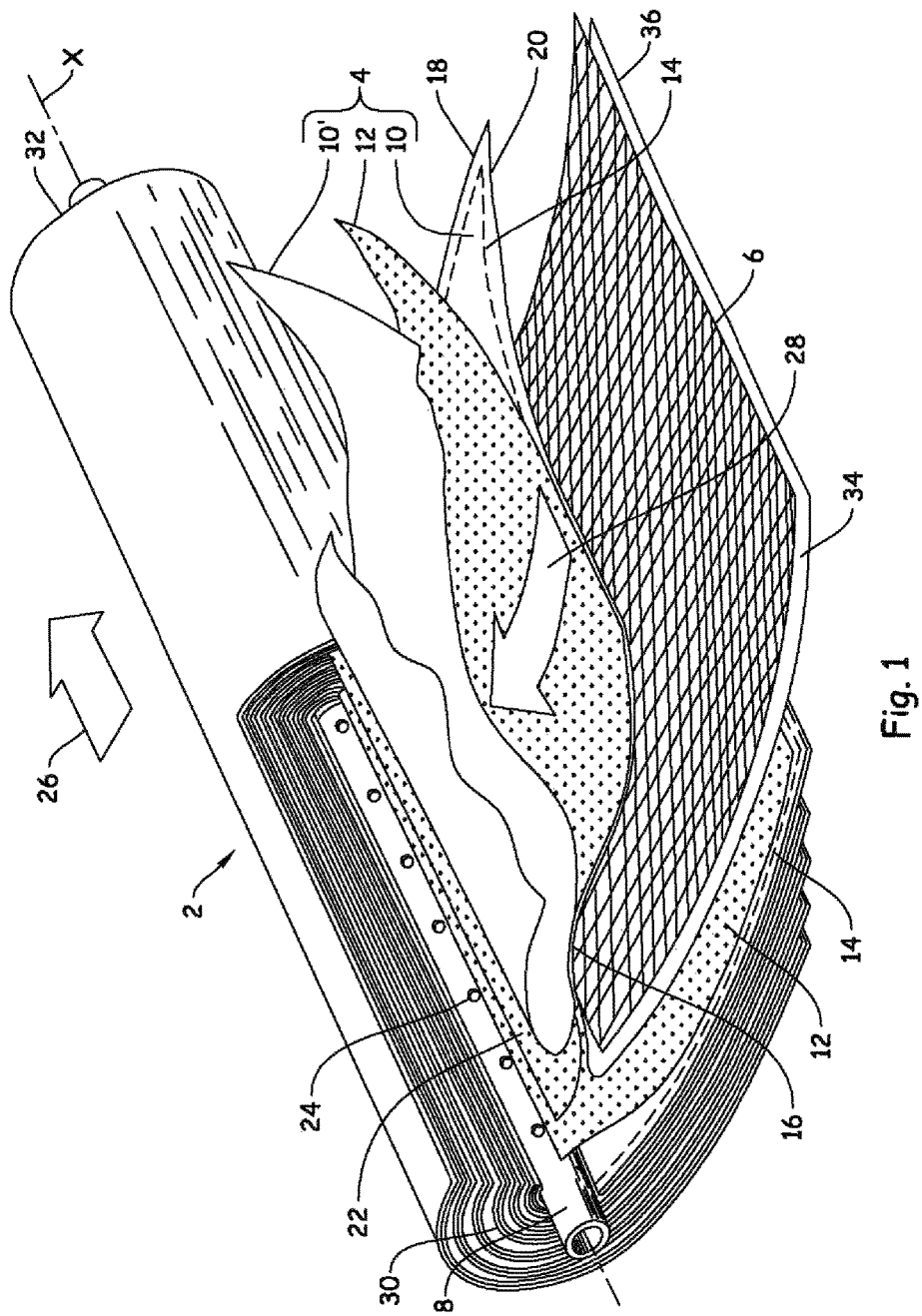
FIG. 1 is a perspective, partially cut-away view of a spiral wound membrane module.

The invention includes a spiral wound filtration assembly including a pressure vessel including a feed port, concentrate port, and at least one permeate port. A bioreactor and at least one but preferably a plurality of spiral wound membrane modules are serially arranged within the pressure vessel such that feed liquid flows successively through both the bioreactor and spiral wound membrane module(s). The bioreactor has a cylindrical outer periphery extending along an axis from a first end to a second end, with an inlet located near the first end and an outlet located near the second end. In one preferred embodiment, the bioreactor has a spiral wound configuration comprising: a flat sheet having two opposing bio-growth surfaces and a feed spacer spirally wound about an axis; wherein the feed spacer defines flow channels extending along the bio-growth surfaces of the flat sheet from the inlet to the outlet of the bioreactor. Feed liquid entering the vessel's feed port flows from into the inlet of the bioreactor and exits via the outlet. A portion of the liquid then flows across the spiral wound membranes modules to exit the vessel at the concentrate port with the remainder of liquid passing through the membranes to exit the vessel at a permeate port. This design is referred to as "integral" in that the bioreactor and spiral wound membrane modules are serially arranged within a common pressure vessel.

The pressure vessels used in the present invention are not particularly limited but preferably include a solid structure capable of withstanding pressures associated with operating conditions. The vessel structure preferably includes a chamber having an inner periphery corresponding to that of the outer periphery of the spiral wound membrane modules to be housed therein. The length of the chamber preferably corresponds to the combined length of the bioreactor and spiral wound membrane modules to be sequentially (axially) loaded. Preferably, the vessel contains at 2 to 8 spiral wound membrane modules, see U.S. 2007/0272628. The pressure vessel may also include one or more end plates that seal the chamber once loaded with modules. The vessel further includes fluid ports for feed and concentrate located at or near opposite ends of the vessel, and at least one permeate port. Commonly, permeate ports are located at both opposite ends of the vessel. The orientation of the pressure vessel is not particularly limited, e.g. both horizontal and vertical orientations may be used. Examples of applicable pressure vessels, module arrangements and loading are described in: U.S. Pat. No. 6,074,595, U.S. Pat. No. 6,165,303, U.S. Pat. No. 6,299,772 and U.S. 2008/0308504. Manufacturers of pressure vessels include Pentair of Minneapolis Minn., Bekaert of Vista Calif. and Bel Composite of Beer Sheva, Israel.

An individual pressure vessel or a group of vessels working together, each equipped with one or more spiral wound membrane modules, can be referred to as a "train" or "pass." The vessel(s) within the pass may be arranged in one or more stages, wherein each stage contains one or more vessels operating in parallel with respect to a feed fluid. Multiple stages are arranged in series, whereby the concentrate fluid from an upstream stage is used as feed fluid for the downstream stage, while the permeate from each stage is collected without further reprocessing within the pass. Multi-pass hyperfiltration systems are constructed by interconnecting individual passes along a fluid pathway as described in: U.S. Pat. No. 4,156,645, U.S. Pat. No. 6,187,200, U.S. Pat. No. 7,144,511 and WO2013/130312.

The spiral wound membrane modules ("elements") useful in the present invention are not particularly limited and include those designed for use in reverse osmosis (RO), nanofiltration (NF), ultrafiltration (UF) and microfiltration (MF). However, the invention finds particular utility in RO and NF applications. (RO and NF can be collectively referred to as hyperfiltration.) In general, spiral wound membrane modules include one or more membrane envelops and feed spacer sheets wound around a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions - depending upon the species of divalent ion. NF membranes also typically reject particles in the nanometer range as well as organic molecules having molecular weights greater than approximately 200 to 500 Daltons.

A representative spiral wound membrane module is generally shown in FIG. 1. The module (2) is formed by concentrically winding one or more membrane envelopes (4) and feed spacer sheet(s) ("feed spacers") (6) about a permeate collection tube (8). Each membrane envelope (4) preferably comprises two substantially rectangular sections of membrane sheet (10, 10'). Each section of membrane sheet (10, 10') has a membrane or front side (34) and support or back side (36). The membrane envelope (4) is formed by overlaying membrane sheets (10, 10') and aligning their edges. In a preferred embodiment, the sections (10, 10') of membrane sheet surround a permeate channel spacer sheet ("permeate spacer") (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with a plurality of openings (24) extending along the length of the permeate collection tube (8). The module (2) preferably comprises a plurality of membrane envelopes (4) separated by a plurality of feed spacers sheets (6). In the illustrated embodiment, membrane envelopes (4) are formed by joining the back side (36) surfaces of adjacently positioned membrane leaf packets. A membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid in an axial direction (i.e. parallel with the permeate collection tube (8)) through the module (2). While not shown, additional intermediate layers may also be included in the assembly. Representative examples of membrane leaf packets and their fabrication are further described in U.S. Pat. No. 7,875,177.

During module fabrication, permeate spacer sheets (12) may be attached about the circumference of the permeate collection tube (8) with membrane leaf packets interleaved there between. The back sides (36) of adjacently positioned membrane leaves (10, 10') are sealed about portions of their periphery (16, 18, 20) to enclose the permeate spacer sheet (12) to form a membrane envelope (4). Suitable techniques for attaching the permeate spacer sheet to the permeate collection tube are described in U.S. Pat. No. 5,538,642. The membrane envelope(s) (4) and feed spacer(s) (6) are wound or "rolled" concentrically about the permeate collection tube (8) to form two opposing scroll faces (30, 32) at opposing ends and the resulting spiral bundle is held in place, such as by tape or other means. The scroll faces of the (30, 32) may then be trimmed and a sealant may optionally be applied at the junction between the scroll face (30, 32) and permeate collection tube (8), as described in U.S. Pat. No. 7,951,295. Long glass fibers may be wound about the partially constructed module and resin (e.g. liquid epoxy) applied and hardened. In an alternative embodiment, tape may be applied upon the circumference of the wound module as described in U.S. Pat. No. 8,142,588. The ends of modules may be fitted with an anti-telescoping device or end cap (not shown) designed to prevent membrane envelopes from shifting under the pressure differential between the inlet and outlet scroll ends of the module. Representative examples are described in: U.S. Pat. No. 5,851,356, U.S. Pat. No. 6,224,767, U.S. Pat. No. 7,063,789, U.S. Pat. No. 7,198,719 and WO2014/120589. While not a required aspect of the invention, preferred embodiments of the invention include end caps which include a locking structure for preventing relative axial movement between engaged end caps. Such a locking structure between end caps may be engaged by aligning adjacent end caps so that one or more projections or catches extending radially inward from the inside of the outer hub of one end cap enter corresponding receptacles arranged about the outer hub of the facing end cap. The end caps are then engaged by rotating one end cap relative to the other until the projections or "catches" contact or "hook" with a corresponding structure of the receptacle. This type of locking end cap is available from The Dow Chemical Company under the iLEC™ mark and is further described in U.S. Pat. No. 6,632,356 and U.S. Pat. No. 8,425,773. If such end caps are not used, interconnecting tubes may be used to prevent mixing of permeate with feed. In order to restrict feed fluid from bypassing the elements within the vessel, various types of seals (e.g. Chevron-type, O-rings, U-cup type, etc.) may be positioned between the outer periphery of the elements and the inner periphery of the vessel. Representative examples are described in: U.S. Pat. No. 8,758,489, U.S. Pat. No. 8,388,842, U.S. Pat. No. 8,110,016, U.S. Pat. No. 6,299,772, U.S. Pat. No. 6,066,254, U.S. Pat. No. 5,851,267, U.S. Pat. No. 8,377,300 and WO2014066035. In some embodiments, seal assemblies are equipped with a bypass that permits limited feed fluid to flow around the elements, e.g. see U.S. Pat. No. 5,128,037, U.S. Pat. No. 7,208,088 and U.S. Pat. No. 8,778,182.

Materials for constructing various components of spiral wound membrane modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Additional permeate spacers are described in U.S. Pat. No. 8,388,848. Representative feed spacers include polyethylene, polyester, and polypropylene mesh materials such as those commercially available under the trade name VEXAR™ from Conwed Plastics. Preferred feed spacers are described in U.S. Pat. No. 6,881,336. Alternatively, the feed spacer may comprise a plurality of raised regions formed on the membrane sheet, e.g. an embossed patterned formed by a die or roller, spheres or lines of polymer deposited upon the membrane sheet, a corrugated film, etc. (See for example U.S. Pat. No. 6,632,357 and U.S. Pat. No. 7,311,831.)

The membrane sheet is not particularly limited and a wide variety of materials may be used, e.g. cellulose acetate materials, polysulfone, polyether sulfone, polyamides, polyvinylidene fluoride, etc. A preferred membrane sheet includes FilmTec Corporation's FT-30™ type membranes, i.e. a flat sheet composite membrane comprising a backing layer (back side) of a nonwoven backing web (e.g. a non-woven fabric such as polyester fiber fabric available from Awa Paper Company), a middle layer comprising a porous support having a typical thickness of about 25-125 µm and top discriminating layer (front side) comprising a thin film polyamide layer having a thickness typically less than about 1 micron, e.g. from 0.01 micron to 1 micron but more commonly from about 0.01 to 0.1 µm. The backing layer is not particularly limited but preferably comprises a non-woven fabric or fibrous web mat including fibers which may be orientated. Alternatively, a woven fabric such as sail cloth may be used. Representative examples are described in U.S. Pat. No. 4,214,994; U.S. Pat. No. 4,795,559; U.S. Pat. No. 5,435,957; U.S. Pat. No. 5,919,026; U.S. Pat. No. 6,156,680; U.S. Pat. No. 8,608,964 and U.S. Pat. No. 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly (methyl methacrylate), polyethylene, polypropylene, and various halogenated polymers such as polyvinylidene fluoride. The discriminating layer is preferably formed by an interfacial polycondensation reaction between a polyfunctional amine monomer and a polyfunctional acyl halide monomer upon the surface of the microporous polymer layer as described in U.S. Pat. No. 4,277,344 and U.S. Pat. No. 6,878,278.

Arrows shown in FIG. 1 represent the approximate flow directions (26, 28) of feed and permeate fluid (also referred to as "product" or "filtrate") during operation. Feed fluid enters the module (2) from an inlet scroll face (30) and flows across the front side(s) (34) of the membrane sheet(s) and exits the module (2) at the opposing outlet scroll face (32). Permeate fluid flows along the permeate spacer sheet (12) in a direction approximately perpendicular to the feed flow as indicated by arrow (28). Actual fluid flow paths vary with details of construction and operating conditions.

While modules are available in a variety of sizes, one common industrial RO module is available with a standard 8 inch (20.3 cm) diameter and 40 inch (101.6 cm) length. For a typical 8 inch diameter module, 26 to 30 individual membrane envelopes are wound around the permeate collection tube (i.e. for permeate collection tubes having an outer diameter of from about 1.5 to 1.9 inches (3.8 cm-4.8 cm)). Less conventional modules may also be used, including those described in U.S. Pat. No. 8,496,825.

The design or configuration of the bioreactor for use in the present invention is not particularly limited. For example, spiral wound, hollow fiber, fluidized bed and plate and frame type configurations may be used but in each case, the outer periphery of the bioreactor is preferably cylindrical and is sized to fit within the pressure vessel containing spiral wound membrane modules. Preferably, the bioreactor has an outer diameter within 10% of a distance selected from 185 mm and 370 mm. These dimensions are similar to those of standard 8-inch diameter spiral wound membrane modules and they allow the bioreactor to fit within the most common dimensions of similarly-sized vessels and pipes. While the inlet and outlet ends of the cylindrical bioreactor may be flat, other configurations may be used. For example, when the vessel comprises a side port for feed liquid, increased volume of the bioreactor may be obtained by extending the bioreactor closer to the upstream end of the vessel in locations that do not interfere with flow out of the vessel's feed port. In one preferred embodiment, the vessel has a side inlet port and the bioreactor unit extends (e.g. cylindrical wedge or cone shaped end) into a region of the vessel at an axial position parallel to the inlet port.

The outer periphery of the bioreactor may be finished in the same manner as described above with respect to spiral wound membrane modules, e.g. tape, fiberglass, etc. The bioreactor may alternatively be encased in a molded, shrink-wrapped, or extruded shell (e.g. PVC or CPVC). The outer diameter is also preferably the same or similar to that of the spiral wound membrane modules so as to provide a similar fit within the pressure vessel. However, brine seals may be disposed about the bioreactor to compensate for differences in outer diameter as compared with spiral wound membrane modules. Alternatively or additionally, the bioreactor may include anti-telescoping devices which are commonly used in connection with spiral wound membrane modules. In one embodiment, the bioreactor includes an end cap that interlocks with an adjacent spiral wound membrane module (see for example U.S. Pat. No. 6,632,356 and U.S. Pat. No. 8,425,773).

The bioreactor is preferably arranged within the vessel at a location upstream of at least one and preferably all of the spiral wound membrane module(s) within the vessel. With such an arrangement, bio-nutrients present in the feed water are consumed by microorganisms present in the bioreactor and are less available for the downstream spiral wound membrane modules—thereby reducing biofouling in the membrane modules. Because the bioreactor is within the vessel, space is conserved and additional pressurization and containment of a bioreactor is not required. As the bioreactor does not serve as a membrane filtration device, the build-up of biofilms within the bioreactor has little impact on the separation efficiency of downstream spiral wound membrane modules. If bio-growth eventually restricts feed flow through the bioreactor, the bioreactor may be cleaned or replaced.

The bioreactor includes bio-growth surfaces and flow channels that extend from the inlet to the outlet. The bioreactor is preferably sized sufficient to protect downstream spiral wound modules. Because of the relatively high flow rates desired in many embodiments of the invention, growth surfaces may be defined as those surfaces adjacent the flow channels that connect the inlet and outlet of the bioreactor. Preferably, the bioreactor has a bio-growth surface area that is at least equal to, and more preferably at least 1.5 times or at least 2.0 times, the surface area of membrane (exposed to feed) within the adjacent spiral wound module. However, the total membrane surface area within the vessel is less important, so that the ratio of flat sheet area within the bioreactor to the area of exposed membrane surfaces in downstream hyperfiltration modules is preferably less than 1.0 and more preferably less than 0.5.

In order to operate at high flow rates while removing the bulk of bio-nutrients that can lead to fouling in downstream spiral wound membrane modules, a large area of bio-growth surface contacting the flow channels is desired, while still providing minimal resistance to flow through the bioreactor. Preferably, the void volume (volume not occupied by a solid between bio-growth surfaces) of flow channels comprises at least 65% (more preferably 75% or even 85%) of the volume of the bioreactor. The ratio of bio-growth surface area to bioreactor volume for each bioreactor is preferably between 15 $cm^{-1}$ and 150 $cm^{-1}$ (more preferably between 20 $cm^{-1}$ and 100 $cm^{-1}$). In one embodiment, the bioreactor comprises a packed bed of particulates, the surface of which provide bio-growth surfaces and flow channels exist between individual particles. In other embodiments, a flat or tubular sheet may provide bio-growth surfaces whereas flow channels may be provided by the space between or by way of a spacer material including grooves or flow pathways (e.g. woven material, etc.)

Figure 2:
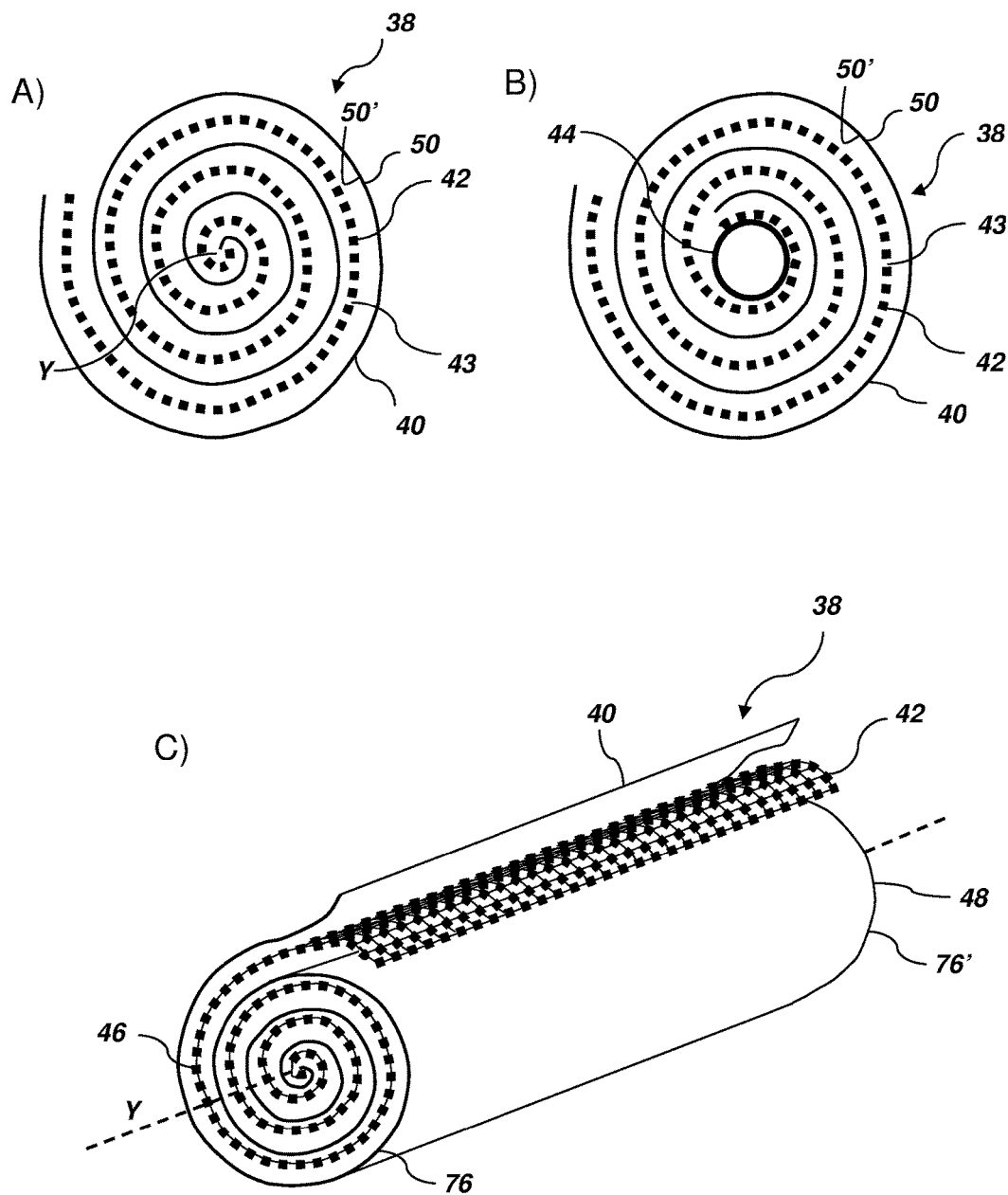
FIGS. 2A-B are elevation views of spiral wound bioreactors.
FIG. 2C is a perspective view of a spiral wound bioreactor.

FIGS. 2A, 2B and 2C illustrate various embodiments of the bioreactor in a spiral wound configuration. More specifically, the bioreactor (38) is shown having a cylindrical outer periphery extending along an axis (Y) from a first end (76) to a second end (76') with an inlet (46) located near the first end (76), and an outlet (48) located near the second end (76'). The bioreactor (38) includes a a flat sheet (40) having two opposing bio-growth surfaces (50, 50') and a feed spacer (42) spirally wound about an axis (Y); wherein the feed spacer (42) defines flow channels (43) extending along the bio-growth surfaces (50, 50') of the flat sheet (40) from the inlet (46) to the outlet (48) of the bioreactor (38). The process of winding creates flow channels (43) adjacent bio-growth surfaces (50,50') on opposite side of the flat sheet (40).

In FIG. 2B, the flat sheet (40) and spacer (42) are spirally wound about a hollow conduit (44). In an alternative embodiment not shown, the hollow conduit may be replaced with a solid rod. While shown in FIG. 2B as including a hollow conduit (44), the conduit of the bioreactor (38) is preferably impermeable and thus sealed from direct fluid communication with the flat sheet (40) and feed spacer (42) and is serially connected to the permeate tubes (8) of the spiral wound modules (2, 2', 2", 2'"). (FIGS. 3B and 3C illustrate assemblies with similar arrangement.) Thus, the bioreactor does not function as a spiral wound membrane module in that the flat sheet does not produce a permeate that flows into the conduit. Rather, feed passes into an inlet (46) of the bioreactor, passes along flow channels of the feed spacer (42) and exits via an outlet (48), as generally indicated by arrows in FIG. 2C. While passing through the bioreactor (38), liquid (e.g. water) contacts the flat sheet (40) which provides a platform for microorganisms to reside. Nutrients in the feed are consumed by microorganisms, so that liquid exiting the bioreactor (38) is depleted of nutrients prior to passing to downstream spiral wound membrane modules (shown in FIG. 3).

The feed spacer (42) preferably provides flow channels (43) of between 0.1 mm and 1.5 mm, more preferably between 0.15 mm and 1.0 mm, between adjacent bio-growth surfaces (50, 50'). A channel of less than 0.15 mm is more easily occluded by bio-growth, so that pressure drop through the flow channels requires more frequent cleanings. A channel of greater than 1.0 mm is less efficient at creating bio-growth that is desired to eliminate problematic nutrients. As with spiral wound membrane modules (2, 2', 2", 2'"), the spiral wound bioreactor (38) may be made with more than one overlapping flat sheet and spacer, but it is preferred to use only a single flat sheet.

As mentioned, the flat sheet (40) of the bioreactor (38) comprises two opposing (outer) bio-growth surfaces (50, 50'). The flat sheet may be impermeable. Alternatively, to aid in cleaning, the opposing bio-growth surfaces (50, 50') may be in fluid communication with each other through the matrix of the flat sheet (40). While not particularly limited, this permeable flat sheet may include a generally impermeable sheet with perforations, a UF or MF membrane, woven or nonwoven material, fibrous matrix, etc. Examples of suitable materials are described in U.S. Pat. No. 5,563,069. However, unlike the general design described in U.S. Pat. No. 5,563,069, the flat sheet of the present invention includes bio-growth surfaces (50, 50') on both outer faces which are separated by a feed spacer (42). Preferred materials include polymer sheets having pore sizes greater than 0.1 µm, or greater than 10 µm. The polymer sheet may also include macropores of sizes greater than 10 µm which facilitate disturbing fluid into fouled regions during cleaning. Applicable polymers include but are not limited to polyethylene, polypropylene, polysulfone, polyether sulfone, polyamides, and polyvinylidene fluoride. As the bioreactor of this invention preferably operates at relatively high flow rates, the flat sheet thickness is preferably less than the spacer thickness. Preferably, the flat sheet thickness is less than 1 mm, and more preferably less than 0.5 mm, or even less than 0.2 mm.

The feed spacer (42) of the spiral wound bioreactor (38) is not particularly limited and includes the feed spacers described above in connection with spiral wound membrane modules. It is desired that the majority of flat sheet adjacent a spacer is not occluded by contact with the spacer. Preferred structures for spacers include a net-like sheet material having intersection points of greater thickness than the average thickness of strands therebetween. The spacer may be a collection of raised regions of the flat sheet, such as formed by a bossing step, by application of adhesive lines to the flat sheet, or by affixing of appropriately-sized core/shell balls to the surface. Once spirally wound, the feed spacer preferably provides flow channels of from 0.10 mm to 1.5 mm, more preferably 0.15 mm to 1.0 mm, between adjacent bio-growth surfaces of the flat sheet. When provided in a sheet format, proximate feed spacer (42) and flat sheet (40) sections may be selectively bound together, e.g. adhered together along portions of their periphery or intermittent regions on their surfaces. Such bonding adds strength to the bioreactor and mitigates telescoping.

Representative embodiments of the subject spiral wound filtration assembly are generally shown in FIGS. 3A-D, including a pressure vessel (52) with a feed port (54), concentrate port (56) and permeate port (58). The feed port

(54) is adapted for connection with a pressurized source of feed liquid that may enter the vessel (52). The concentrate port (56) is adapted for connection to a pathway for re-use or disposal. The permeate port (58) is adapted for connection to a pathway outside the vessel for storage, use or further treatment. Four spiral wound membrane modules (2, 2', 2" and 2''') are serially arranged within the vessel (52) with a first element (2) of the series positioned nearest to a first end (60) of the pressure vessel (52) and a last element (2''') of the series positioned adjacent to an opposing second end (62) of the pressure vessel (52). For purposes of clarity, the "ends" of the vessel includes those portions extending beyond the distal or axial ends of the modules positioned within the vessel. For example, the feed port (54) and concentrate port (56) may be position on the radial sides of a cylindrical vessel or at an axial position as illustrated in FIGS. 3A, C and D. The permeate tubes (8) of the spiral wound membrane modules (2, 2', 2", 2''') are serially connected to form a permeate pathway (shown by arrows) which is connected to the permeate port (58). The means for connecting the conduit (44) and tubes (8) of the modules is not particularly limited. For example, interconnecting tubes (64) or end caps (not shown) which typically include pressure fit seals or O-rings are common in the art and are suitable for use in the present invention. A permeate pathway may alternatively be split with a complete or partial barrier to flow, as in U.S. Pat. No. 4,046,685, to direct permeate from different spiral wound membrane modules in the vessel to opposite ends of the vessel. While shown including four modules, other quantities may be used, e.g. 1 to 12.

The bioreactor (38) is position adjacent the first end (60) of the vessel (52) in series and upstream from all spiral wound membrane modules (2, 2', 2", 2'''), but may be alternatively positioned between the spiral wound membrane modules or located near the second end (62) of the vessel (52). In preferred embodiments, the bioreactor is located upstream of at least one spiral wound membrane module but more preferably all the spiral wound membrane modules. While not shown, a plurality of bioreactors may be utilized within a single vessel, and adjacent bioreactors in series may be considered as one. In operation feed liquid flows successively through both the bioreactor and spiral wound membrane module.

In FIGS. 3A-D, the bioreactor (38) extends along an axis from a first end (76) to a second end (76') flow channels (43) that extend between the inlet (46) and outlet (48), located on opposing first (76) and second ends (76'). With specific reference to FIGS. 3A and 3D, the bioreactor includes (38) a solid rod (78) or center axis. In these embodiments, no permeate flows through the bioreactor. In contrast, the bioreactors in embodiments of FIGS. 3B and 3C include a hollow conduit (44) that is connected with the permeate tubes (8) of the spiral wound membrane modules (2, 2', 2", 2''') to form a permeate pathway for permeate to exit the vessel (52) via the permeate port (56). In the embodiments of FIGS. 3A, 3B and 3D, a single permeate port (58) is provided whereas in FIG. 3C, permeate ports (58) are provided at both ends (60, 62) of the vessel (52).

Ports in the pressure vessel (52) may be specific to the bioreactor (38). In FIGS. 3C and 3D, the vessel (52) comprises two opposing end plates (80, 80'), a feed port (54), a concentrate port (56), and at least one permeate port (58). However, the end plate (80) nearest the bioreactor unit may comprises an additional fluid port connected to the bioreactor (38). In FIG. 3D, the filtration assembly includes a hollow conduit (44) extending through the bioreactor. The conduit (44) connects said flow channels (43) in the bioreactor with a port (in addition to feed, concentrate, and permeate ports) on the vessel end cap. With this arrangement, FIG. 3D further shows two separate ports on the vessel in communication with the bioreactor flow channels (43). This forms a potential continuous path for fluid flow into the vessel, through the bioreactor's flow channels (43), and out of the vessel, and said path does not pass through spiral wound modules.

The bioreactor may alternate between an operating mode and a cleaning mode. In the operating mode, fluid from the feed port enters the bioreactor at its inlet and exits the bioreactor at its outlet. Preferably, the fluid has an average residence time of less than 10 seconds (1 to 10 seconds) within the bioreactor; more preferably the average residence is less than 5 seconds within the bioreactor. Preferably, the average velocity of liquid entering the bioreactor unit is less than the average velocity of liquid moving through the adjacent spiral wound membrane module.

In the cleaning mode, a cleaning fluid contacts the bio-growth surfaces (50, 50') adjacent to the flow channels (43). FIG. 4 illustrates different methods for cleaning a bioreactor within a vessel. In FIG. 4A, a cleaning fluid is supplied through the entire module in a direction commonly used for feed flow. In the FIG. 4B, cleaning fluid is flushed through the vessel in the reverse direction so that contaminants in the bioreactor are not flushed through the spiral wound membrane modules. A filtration assembly may alternatively be configured such that the inside of a hollow conduit (44) extending through the bioreactor (38) is in fluid contact with either the inlet (46) or the outlet (48) of the bioreactor. As illustrated in embodiments FIGS. 4C and 4D, one advantage of this configuration is that it can allow a cleaning fluid to pass through the bioreactor (38) and not substantially pass through the spiral wound membrane modules (2, 2', 2", 2'''). In these embodiments, the amount of flow through downstream spiral wound modules is reduced and will ultimately depend on the relative resistance provided for concentrate flow from the vessel. This allows the use of cleaning agents that might otherwise degrade the membranes of the spiral wound modules. For example, the cleaning fluid used for cleaning the bioreactor unit may be selected from a solution less than pH 1, a solution greater than pH 13, a solution greater than 60° C., or a solution containing an oxidizing agent. In a preferred process, the bioreactor is operated at a lower average pressure during the cleaning mode than in during the operating mode. This allows higher temps to be more easily attained and it also limits potential hazards from any leaks of cleaning fluid.

In a preferred embodiment, the pressure difference across the bioreactor is measured in the operating mode, and switching from the operating mode to the cleaning mode is triggered by the measured pressure difference. FIG. 3D illustrates how a hollow conduit (44) through the bioreactor can be connected to a pressure measurement device (82) to allow measurement of pressure at its outlet. The hollow conduit (44) previously described for cleaning purposes would also be sufficient also for measuring pressure between the bioreactor and the RO using pressure sensors outside the vessel. In a preferred embodiment, the bioreactor unit has a pressure drop of less than 10 psi (more preferably less than 5 psi) after the cleaning mode. In one embodiment, the cleaning mode is commenced after a pressure drop of the bioreactor exceeds 10 psi, or more preferably after it exceeds 20 psi.

A particular bio-growth population within the bioreactor may be encouraged, particularly after transitioning from the cleaning mode to the operating mode. Following a cleaning, the bioreactor may be inoculated (e.g. with a particular set of bacteria). The inoculant may be derived from solutions previously extracted from the bioreactor. A nutrient may also be dosed during at least a part of the operating mode.

Many embodiments of the invention have been described and in some instances certain embodiments, selections, ranges, constituents, or other features have been characterized as being "preferred." Such designations of "preferred" features should in no way be interpreted as an essential or critical aspect of the invention. The entire content of each of the aforementioned patents and patent applications are incorporated herein by reference.

The invention claimed is:

1. A spiral wound filtration assembly comprising:
 i) a pressure vessel (52) comprising a feed port (54), concentrate port (56) and permeate port (58);
 ii) at least one spiral wound membrane module (2) comprising at least one membrane envelop (4) wound around a permeate tube (8) which forms a permeate pathway to the permeate port (58); and
 iii) a bioreactor (38) having a cylindrical outer periphery extending along an axis (Y) from a first end (76) to a second end (76'), an inlet (46) located near the first end (76), and an outlet (48) located near the second end (76') and comprises at least one of:
  1) a bed of particulates having bio-growth surfaces and flow channels between individual particles, wherein the bio-growth surfaces are defined as those surfaces adjacent to the flow channels that connect the inlet (46) and outlet (48) of the bioreactor (38) and wherein the flow channels have a void volume between bio-growth surfaces that is not occupied by a solid, and wherein the void volume of the flow channels is at least 65% of the volume of the bioreactor (38), and
  2) a permeable flat sheet (40) having two opposing bio-growth surfaces (50, 50') and a feed spacer (42) defining flow channels (43) extending along the bio-growth surfaces (50, 50') of the flat sheet (40) from the inlet (46) to the outlet (48) of the bioreactor (38); wherein the flat sheet (40) is spirally wound about a solid rod or hollow conduit (44) sealed from fluid communication with the flat sheet (40) and feed spacer (42) and serially connected to the permeate tube (8) of the spiral wound membrane module (2) and; wherein the spiral wound membrane module (2) and bioreactor (38) are serially arranged within the pressure vessel (52).

2. The assembly of claim 1 wherein the flat sheet (40) is permeable and the two opposing bio-growth surfaces (50, 50') are in fluid communication with each other.

3. The assembly of claim 1 further comprising a plurality of spiral wound membrane modules (2, 2', 2", 2'''), each comprising at least one membrane envelop wound (4) around a permeate tube (8), and wherein the spiral wound membrane modules (2, 2', 2", 2''') are serially arranged within the pressure vessel (52) with a first element (2) of the series positioned nearest to a first end (60) of the pressure vessel (52) and a last element (2''') of the series positioned adjacent to an opposing second end (62) of the pressure vessel (52), and wherein the permeate tubes (8) of the spiral wound elements are serially connected to form a permeate pathway which is connected to the permeate port (58), and wherein the bioreactor (38) is arranged within said series at a location upstream of at least one spiral wound membrane module (2).

4. The assembly of claim 3 wherein the bioreactor (38) is arranged within the series at a location upstream of all spiral wound membrane modules (2, 2', 2", 2''').

5. The assembly of claim 1 wherein the feed spacer (42) of the bioreactor (38) provides flow channels (43) of from 0.10 mm to 1.5 mm between adjacent bio-growth surfaces (50, 50') of the flat sheet (40).

6. The assembly of claim 1 wherein the flow channels have a void volume between bio-growth surfaces that is not occupied by a solid, and wherein the void volume of the flow channels is at least 65% of the volume of the bioreactor.

\* \* \* \* \*